April 9, 1946.　　　　B. H. BROWALL　　　　2,398,285
BRAKING SYSTEM FOR VEHICLES WITH A SHORT
WHEEL BASE, ESPECIALLY RAILWAY BOGIES
Filed April 6, 1943　　　　4 Sheets-Sheet 1
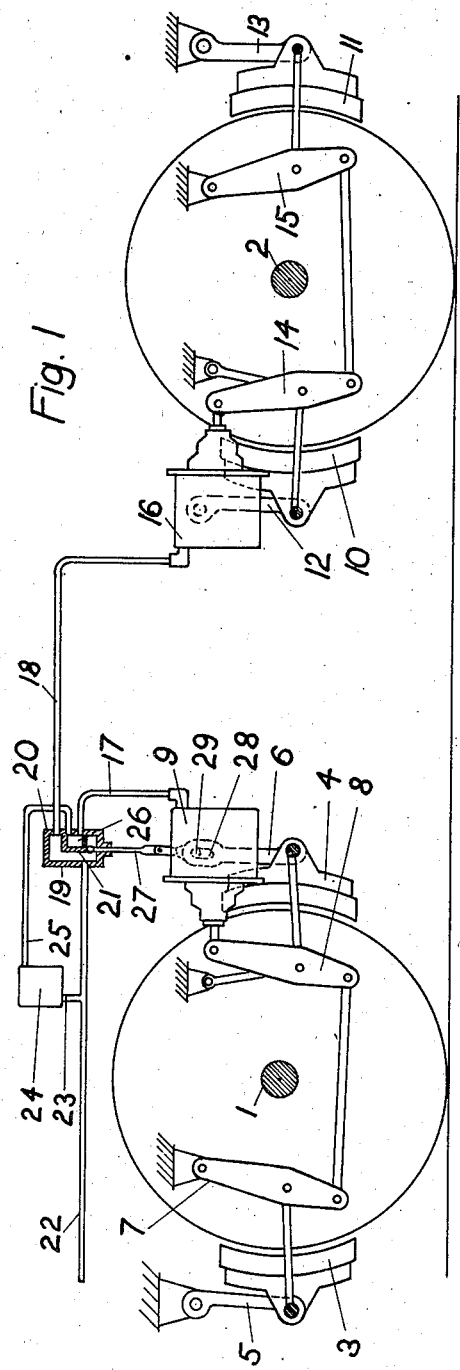
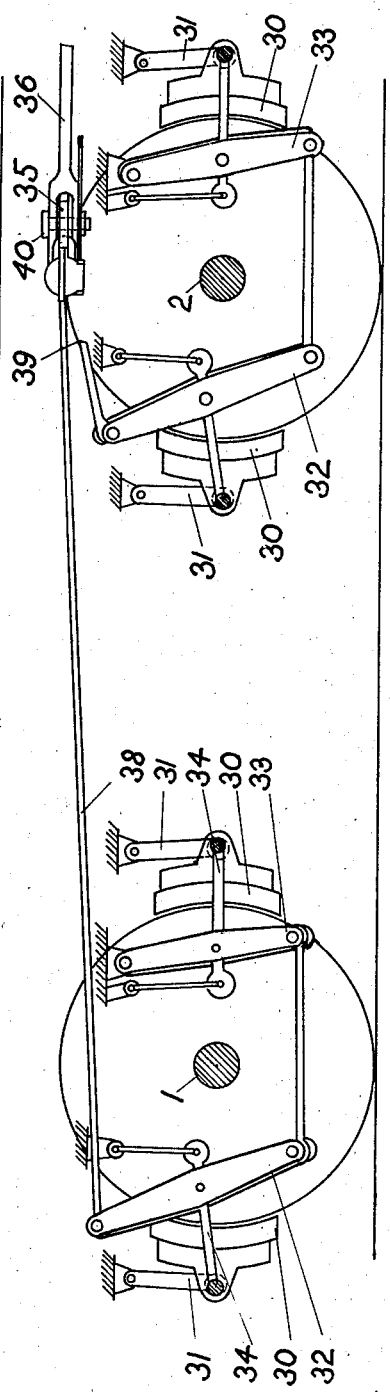
Inventor
Bert Henry Browall

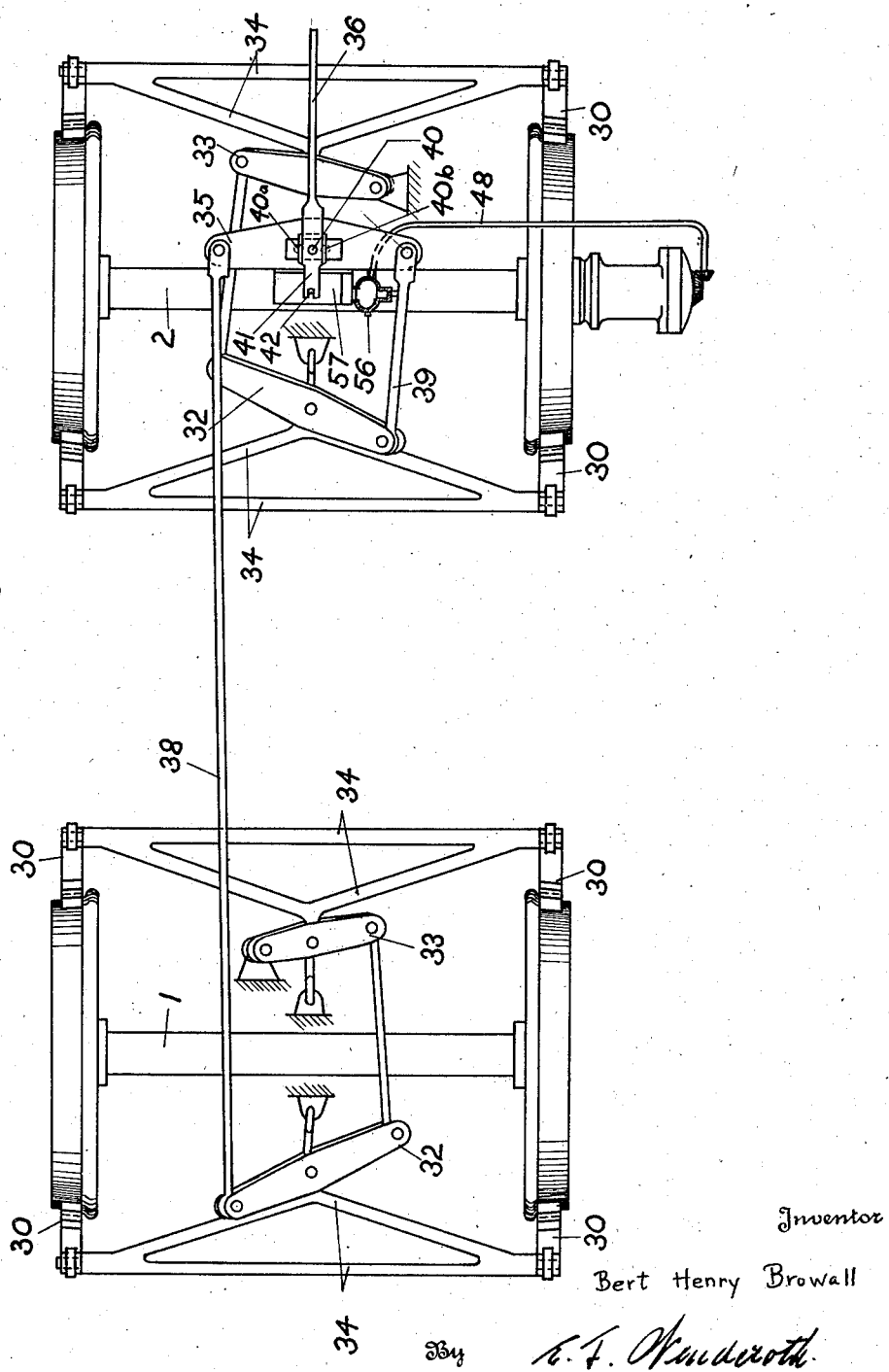

April 9, 1946.  B. H. BROWALL  2,398,285
BRAKING SYSTEM FOR VEHICLES WITH A SHORT
WHEEL BASE, ESPECIALLY RAILWAY BOGIES
Filed April 6, 1943  4 Sheets-Sheet 4

Inventor

Bert Henry Browall

By E. F. Wendroth

Attorney

Patented Apr. 9, 1946

2,398,285

UNITED STATES PATENT OFFICE 2,398,285

BRAKING SYSTEM FOR VEHICLES WITH A SHORT WHEEL BASE, ESPECIALLY RAILWAY BOGIES

Bert Henry Browall, Malmo, Sweden, assignor to Svenska Aktiebolaget Bromsregulator, Malmo, Sweden, a corporation of Sweden Application April 6, 1943, Serial No. 482,046
In Sweden March 7, 1942

8 Claims. (Cl. 188—153)

When braking a vehicle provided with brakes working on the wheels or their axles, a momentum is created in the vehicle, partly by the inertia with its centre in the centre of gravity of the vehicle or vehicle and load, partly by the retardatory power created between the surface of the braked wheels and the surface on which the wheels are running. This momentum, as is well known, causes an increase of the wheel pressure on the front axle wheels and a corresponding decrease of pressure on the back axle wheels. With vehicles with a fairly long wheel base this transposition of wheel pressure, and consequent increase of pressure on the front wheels, when the brakes are applied, is hardly great enough to be considered when calculating the braking power. With short vehicles, especially railway bogies, however, the said transposition of wheel pressure cannot be neglected. Railway bogies form a typical example of vehicles with a short wheel base subject to a comparatively high braking power, and the transposition of wheel pressure from one axle to the other can be so great as to cause a danger of an immediate locking of the back wheels whilst the increased adhesion of the front wheels is not made use of to its full extent when the full brake power is applied.

To remedy this inconvenience, it has already been proposed to transfer automatically a certain part of the effective braking power from the back axle to the front axle by means of a lever between the axles which, when the brakes are applied, is subjected to the frictional forces of the brake blocks acting on the brake block suspenders and which, when trying to turn under the action of these forces, sets into operation a separate connecting system between the brake blocks of the back axle and those of the front axle, thereby causing a certain decrease of the block pressure on the back axle and a corresponding increase on the front axle. In this way, at least theoretically, the brake-block pressures of both axles are adjusted to the real wheel pressures when the brakes are applied, but the system has certain practical disadvantages. It is heavy, demands strong bearings and, owing to the consequent and unavoidable springiness of the points to which the brake blocks are attached, there is a great danger of the brakes "jarring."

The present invention has in view a different and more reliable way of producing the unequal distribution of the braking power between the front and the back axles of vehicles, especially of bogies.

The general characteristics of this invention are that the two brake arrangements on each of the two axles receive their brake power from a common source of power through a distributing mechanism that can be set in two positions, each position for distributing a greater part of the brake power to one of two axles than to the other. The distribution mechanism is set in one of its two positions when the vehicle is going one way, in the other, when the vehicle is going in the opposite direction, so that in both cases the axle which happens to be the front axle is subject to a greater part of the braking power applied than the back axle is. The distributor can be set by hand, but it can also, and preferably, be constructed in such a way that the running direction of the vehicle adjusts the distributor automatically.

The invention is illustrated in various forms in the accompanying drawings in which:

Fig. 1 illustrates in elevation and partly cross-sectionally a railway bogie provided with a separate brake cylinder for each of the axles, and with the distributor in the form of a slide-valve to distribute the compressed air to the two cylinders.

Figs. 2 and 3 illustrate in the same way as Fig. 1 and in plan view, respectively, a railway bogie with a common brake cylinder for both axles, and the distributor constructed in the form of an equalizing balance, each of its two ends being connected with one of the brake arrangements belonging to the two axles; the brake power being applied on a shiftable fulcrum that can slide along the balance between two end-positions.

Figure 4:
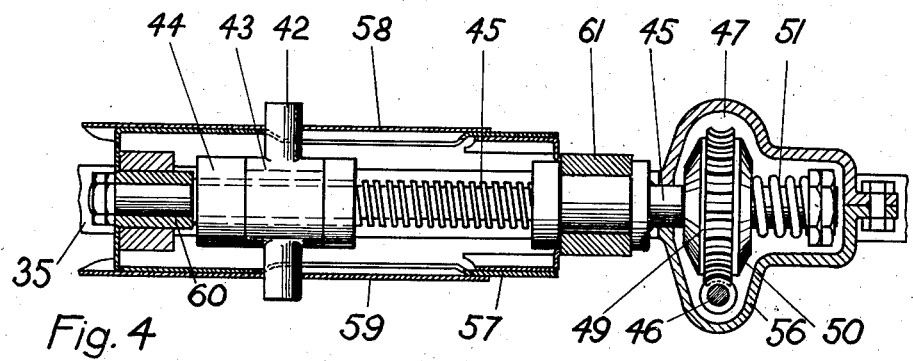
Figs. 4 and 5 are detail vertical and horizontal sections, and Fig. 6 a cross-section along the line VI—VI in Fig. 5, of mechanism for shifting the shiftable fulcrum of the equalizing balance in the form of Figs. 2 and 3.

In Fig. 1, 1 and 2 denote the two axles of a railway bogie. Belonging to axle 1 is a brake arrangement, consisting of the brake blocks 3 and 4 with their brake suspenders 5 and 6, the connected brake levers 7 and 8 and the brake cylinder 9. Axle 2 has a similar brake arrangement consisting of brake blocks 10 and 11 with their suspenders 12 and 13, the connected brake levers 14 and 15 and the brake cylinder 16. By means of the pipes 17 and 18, both brake cylinders 9 and 16 are each separately connected with the distributor 19, which, in this case, contains a slide valve chamber 20 and a slide valve 21 shiftable between two end-positions. The compressed air operating both sets of brakes, comes from a common source and enters the slide chamber 19 through the pipe 22. Pipe 22 is provided with a branch pipe 23 which by means of the pressure reducing device 24 and pipe 25 leads through the wall of the slide valve chamber into the slide 21. In the position shown in the drawings, the slide is in its lower position. In this position, thanks to its cavity 26, it connects pipe 25 with pipe 17 but leaves pipe 18 in direct connection with the slide chamber 20 and pipe 22. By connecting rod 27, slide 21 is connected with brake suspender 6 which is provided with along-hole 28 whereby the connecting rod receives a certain limited amount of vertical play in relation to the suspension bolt 29. This construction works as follows.

Suppose the bogie is going from left to right in the drawings, axle 2 is the front axle. When the brakes are applied, compressed air enters through the pipe 22, and the brake blocks begin to press against the wheels, suspender 6 is subject to a downward pull by block 4 so that the slide 21 immediately comes down to its lower position, if it is not already there. In this position of the slide the full pressure of the compressed air goes from pipe 22 through the slide chamber 20 and the pipe 18 direct to the brake cylinder 16, whilst brake cylinder 9 receives air of reduced compression through pipe 23, pressure reducing device 24, pipe 25, the cavity 26 and pipe 17. The brake arrangement is therefore calculated in such a way that brake cylinder 16, when subjected to full pressure, produces sufficient braking power on axle 2 that the increased adhesive weight of the latter is made use of, whilst the pressure reducing device 24 is adjusted for such reduction of the pressure operating on brake cylinder 9, that the danger of the brakes locking the wheels is eliminated.

If the vehicle is going in the opposite direction (from right to left in the drawings) the brake suspender 6 is subjected to an upward pressure by block 4, so that the suspender 6 and slide 21 are immediately lifted to their higher position, thus connecting pipe 17 directly with the slide chamber 20 and pipe 22 whilst pipe 18 is connected with the pressure reducing device 24 through the cavity 26 and pipe 25. Also in this case, it is the axle which happens to be the front one (axle 1) that receives the greater braking pressure whilst the braking pressure on axle 2 is correspondingly reduced.

Figs. 2 and 3 illustrate a side view, partly in section, and a plan view, respectively, of a two-axled railway bogie with a brake arrangement for each axle. This arrangement consists of the brake blocks 30 with their suspenders 31, the connected brake levers 32 and 33 and the brake blocks connected with the brake levers by the brake triangles 34. To supply the brake power to the brake arrangements of the two axles 1 and 2 they are connected with a common brake cylinder (not shown) by means of the brake pressure distributor which, in this case, consists of a balance 35. Brake power is conducted from the brake cylinder to the balance 35 by means of the brake rod 36 operating on a point between the two ends of the balance; the brake power is then conducted from the balance further to both of the brake arrangements for the two axles 1 and 2, which, for this purpose, are each connected to its corresponding end of the balance by the pull rods 38 and 39 operating between brake levers 32 and the ends of brake balance 35.

According to the construction shown, the rod 36 acts on the balance 35 by means of a fulcrum bolt 40 which connects rod 36 with a slidable die-block 35a in a slot 35b (see Fig. 5) in the balance 35, said fulcrum being thus shiftable along the balance between two end positions 40a and 40b (see Fig. 3) equidistant from the centre of the balance.

In Fig. 3 bolt 40 is shown unnaturally in the central position, normally it is in one of the end positions 40a or 40b. When the fulcrum 40 of the balance 35 is in position 40a, the brake power applied by the rod 36 is distributed in such a way, that rod 38 receives more power than rod 39, i. e. the axle 1 is subjected to more brake power than axle 2, and vice versa when the fulcrum is in the end-position 40b.

To shift the fulcrum 40 to the one position or the other 40a or 40b, the end 41 of the rod 36 projecting beyond the fulcrum 40 has the form of a fork, each prong of which is also fork-like. These fork-like prongs grip the pins 42 on the cross-piece 43 that is revolvable, but not slidable, on the adjusting nut 44 (see Fig. 4). The adjusting-nut 44 is mounted on screw spindle 45 resting in the two bearings 60 and 61 projecting from the balance 35. The screw spindle is turned by a worm gearing 46, 47 that is driven from one of the wheel axles by means of a flexible shaft 48 (see Fig. 3). The screw-wheel 47 is not mounted direct onto the spindle, but connected with the latter by a slip-friction clutch, which, in accordance with the construction shown, consists of two friction-discs 49 and 50 that cooperate with the screw-wheel and are situated on either side of the latter. One of these discs is firmly fixed to spindle 45, whereas the other is free to revolve on the spindle, and is worked by a spring 51.

The above-mentioned slip-friction clutch is an emergency device, in case the brakes should be applied so soon after the vehicle has changed its direction of motion, that the adjusting nut should not get time enough to go over to its other position, before the continued movement of the adjusting nut towards said position is stopped by the stress created in the brake rigging when the brakes are applied. But the clutch need not slip continuously during the motion of the vehicle after the complete adjustment of the adjusting nut, the latter being constructed so as to partake in the rotation of the spindle 24 until such time as the vehicle again changes its direction of motion. For this purpose adjusting nut 44 cooperates with fillet 53 by means of a pin 52. The fillet 53 is situated between bearings 60 and 61, and is a little shorter than the distance between the two end-positions of the adjusting nut (see Figs. 5 and 6). As long as pin 52 presses against the fillet 53, adjusting nut 44 cannot rotate (at least not more than part of a revolution and only when the rotatory direction of spindle 45 is changed).

Figure 5:
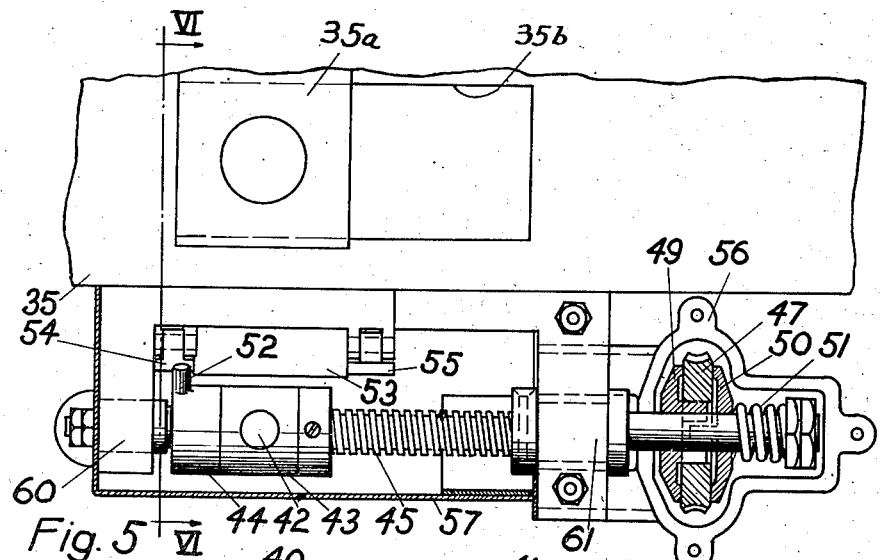
Figure 6:
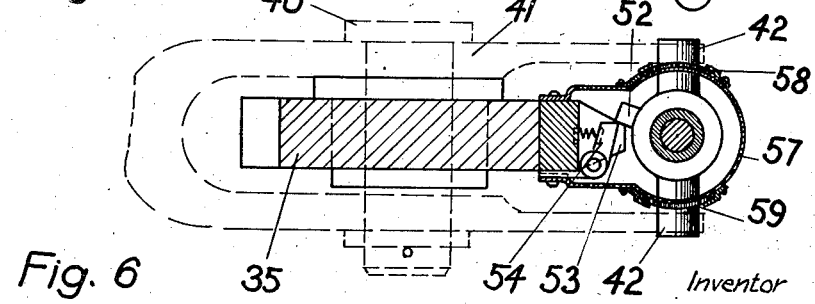

The fillet 53 has at either end a pawl 54 and 55 respectively, pointing in opposite directions to each other. The pawl to the left in Fig. 5 is directed upwards, the one to the right, downwards. In the position shown in Figs. 5 and 6 nut 44 with pin 52 is beyond the left end of fillet 53. When the nut 44 is in this position and the spindle rotates in one direction (anti-clockwise when seen from the worm gearing), nut 44 rotates together with the spindle, owing to the fact that every time pawl 54 is hit by pin 52, pawl 54 gives way and lets the pin 52 pass. If, however, spindle 45 begins rotating in the opposite direction, pawl 54 (see Fig. 6) supports pin 52, so that the nut is prevented from rotating with the spindle and is moved to the right in Figs. 4 and 5. Pin 52 resting against the upper side of fillet 53, pawl 55 (which is directed oppositely to pawl 54) cannot offer any support to pin 52, leaving nut 44 free to partake in the rotation of the spindle 45, its axial position on the spindle remaining unchanged. Every time pin 52 passes pawl 55, pawl 55 gives way and lets the pin pass. When spindle 45 changes its rotatory direction again, nut 44 follows the rotation of the spindle until pin 52 hits pawl 55, the pawl then stops pin 52, so that nut 44 must move leftwards along the spindle, pin 52 pressing against the under-side of fillet 53.

When pin 52 gets to the left pawl 54, the pin again loses its support, so that nut 44 again rotates with the spindle until the latter again changes its rotatory direction. In this way, the friction clutch 49—51 normally never need slip, its wear and tear therefore being minimal. The friction clutch and the worm-gearing may be encased in a common cope 56; it is also advisable to have nut 44 and its co-operating parts encased in a cope 57 with slots for pins 42. The slots may be covered by lids 58, 59 mounted on, and slidable along with, cross piece 43 so that the desired tightness may be obtained.

A simpler construction would be to mount pins 42 direct on adjusting nut 44, doing without the crosspiece 43 revolving relative to the nut 44, and doing without fillet 53 and pawls 54 and 55, thereby letting the friction-clutch discs slip when the adjusting nut has reached its end-position. The demands on the flexible shaft 48 (Fig. 3) however, would then be greater, and the clutch would sooner or later be less reliable, for which reasons the construction shown, or such as are similar to same, are to be preferred.

Figure 7:
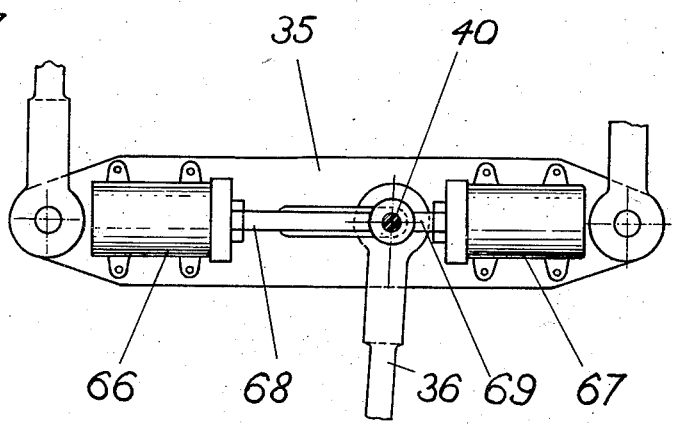
Figs. 7 and 8 are respectively a plan view and a partly sectional and diagrammatic side view of a further form of the mechanism for the shifting of the brake power on the equalizing balance.
Figure 8:
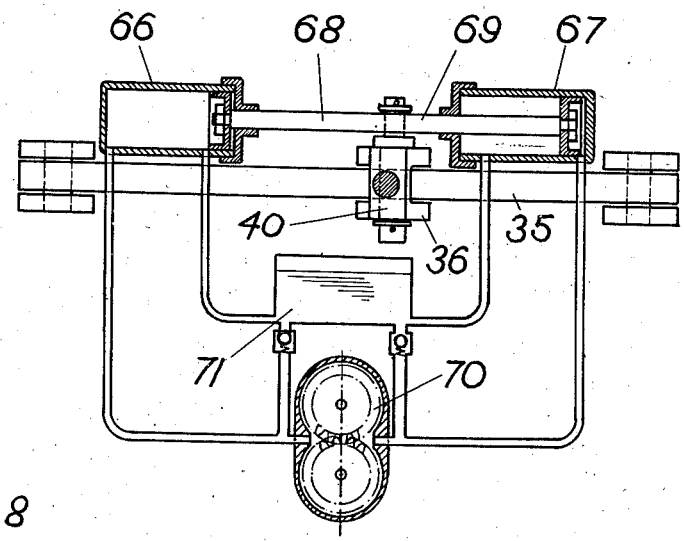

Another form of construction of the automatic shifting of the fulcrum 40 on balance 35 is shown in Figs. 7 and 8. According to this form, the shifting of the fulcrum from one end-position to the other is produced by means of two hydraulic cylinders 66 and 67 containing pistons and piston-rods 68 and 69 acting on fulcrum bolt 40. The outer ends of the two cylinders 66 and 67 are connected each to one side of a pump, e. g. a gear pump 70, to which is driven by one of the axles of the vehicle (the working direction of the pump alternating with the direction of the vehicle) and pumps a liquid from a container 71 to the outer end of one or the other of cylinders 66 and 67. The system is such that when the piston in either of the two cylinders 66 and 67 is pushed into its inner position by the liquid pumped into the said cylinder, this piston uncovers an opening through which that amount of liquid pumped into the cylinder during the continued motion of the vehicle can escape into container 71.

What I claim and desire to secure by Letters Patent is:

1. In a braking system for vehicles, especially railway bogies, having a wheel axle at each end, two braking arrangements, one for each wheel axle, brake shoes for coaction with the wheels and suspenders for said brake shoes, all forming parts of said braking arrangements, one of said brake shoe suspenders being mounted so as to be movable, within limits, in a substantially vertical direction, a common source of brake power for said two braking arrangements, and means including a member shiftable into one or the other of two different positions to distribute the brake power from said common source unequally to said two braking arrangements so that, in one position of said member, one, in the other position of said member, the other, of said two braking arrangements receives the greater part of the brake power when braking, said shiftable member being operatively connected to said vertically movable brake shoe suspender so that said shiftable member will be set in one or the other of its two different positions according as to whether the vehicle is running one way or the other when braking, and so that the braking arrangement for the front wheel axle of the vehicle becomes the one receiving the greater part of the brake power.

2. In a braking system as claimed in claim 1, the additional features that each of said two braking arrangements comprises a separate brake cylinder, that said common source of brake power comprises a compressed air brake pipe for supplying operating air to both said brake cylinders, that said shiftable member comprises a slide valve connected to said brake pipe both directly and indirectly through a pressure reducing device, and that said slide valve, in one of its two different positions, connects one of said brake cylinders directly, the other brake cylinder indirectly through said pressure reducing device, to said brake pipe, whereas said slide valve, in its other position, connects said first-mentioned brake cylinder indirectly through said pressure reducing device, and said other brake cylinder directly, to said brake pipe.

3. In a braking system for vehicles, especially railway bogies, having a wheel axle at each end, two braking arrangements, one for each wheel axle, a common source of brake power for said two braking arrangements, a balance for distributing the brake power to said two braking arrangements, a fulcrum for said balance, forming a point of application for the brake power from said common source and being shiftable along said balance into one or the other of two end positions so that said balance, with said fulcrum in one of said end positions, distributes a greater part of the brake power to one of said braking arrangements than to the other braking arrangement and, with said fulcrum in the other end position, distributes a greater part of the brake power to said first-mentioned braking arrangement than to said other braking arrangement, and means associated with one of said wheel axles, and operable by the rotation thereof, for shifting said fulcrum into one or the other of said two end-positions according to the direction of the rotation of said wheel axle.

4. In a braking system as claimed in claim 3, the additional feature that said means for shifting said fulcrum comprises a screw spindle journaled on said balance, means for driving said screw spindle from one of the wheel axles of the vehicle, in one direction or the other according to the direction in which the vehicle is running, and a nut on said screw spindle, the construction being such that the braking arrangement for the front wheel axle of the vehicle thereby becomes the one to which the greater part of the brake power is distributed.

5. In a braking system as claimed in claim 3, the additional feature that said means for shifting said fulcrum comprises a screw spindle journaled on said balance, means including a flexible shaft and a slip-friction clutch for driving said screw spindle from one of the wheel axles of the vehicle, in one direction or the other, according to the direction in which the vehicle is running, and a nut on said screw spindle, the construction being such that the braking arrangement for the front wheel axle of the vehicle thereby becomes the one to which the greater part of the brake power is distributed.

6. In a braking system for vehicles, especially railway bogies, having a wheel axle at each end, two braking arrangements, one for each wheel axle, a common source of brake power for said two braking arrangements, means including a balance having a fulcrum shiftable into one or the other of two positions, for distributing the brake power unequally to said two brake arrangements so that one or the other of said two braking arrangements receives the greater part of the brake power according as to whether said shiftable fulcrum is shifted into one or the other of said two positions, and automatically operating means for shifting said shiftable fulcrum into one or the other of said positions according to the direction in which the vehicle is running, so that the braking arrangement for the front wheel axle of the vehicle becomes the one receiving the greater part of the brake power, said last mentioned means comprising a screw spindle journaled on said balance and adapted to be driven from one of the wheel axles of the vehicle, in one direction or the other according to the direction in which the vehicle is running, a nut on said screw spindle, means connecting said shiftable fulcrum to said nut, means coacting with said nut for preventing rotation of the nut during its travel between two end positions on said driven screw spindle, a pawl preventing the nut, when in one of said end positions, from partaking in the rotation of the screw spindle in one direction, but permitting the nut to partake in the rotation of the screw spindle in the opposite direction, and a second pawl preventing the nut, when in the other end position, from partaking in the rotation of the screw spindle in said opposite direction, but permitting the nut to partake in the rotation of the screw spindle in the other direction.

7. In a braking system for vehicles, especially railway bogies, having a wheel axle at each end, two brake arrangements, one for each wheel axle, a common source of brake power for said two brake arrangements, means including a member shiftable into the one and the other of two distinct end positions for distributing the brake power unequally to said two brake arrangements so that in the one end position of said member the one, and in the other end position of said member the other of said two brake arrangements receives the greater part of the brake power when braking, and means associated with one of said wheel axles, and operable by the rotation imparted to the wheels when the vehicle is running, for automatically and positively shifting said shiftable member into the one or the other of said two distinct end positions according to the direction of the rotation of the wheels.

8. In a braking system for vehicles, especially railway bogies, having a wheel axle at each end, two braking arrangements, each including a separate brake cylinder, one for each wheel axle, a common source of compressed air for operating said brake cylinders, means including a valve shiftable into the one or the other of two distinct positions, for delivering and distributing compressed air of unreduced and relatively reduced pressures from said common source to said two brake cylinders so that in the one position of said valve the one, and in the other position of said valve the other of said two brake cylinders receives operating air of the relatively reduced pressure when braking, the remaining brake cylinder in each case receiving operating air of the unreduced pressure, and means associated with one of said wheel axles, and operable by the rotation imparted to the wheels when the vehicle is running, for automatically and positively shifting said shiftable valve into the one or the other of said two distinct positions according to the direction in which the vehicle is running, so that the pressure distribution to said two brake cylinders depends solely on the direction in which the vehicle is running when braking.

BERT HENRY BROWALL.